United States Patent [19]

Yukawa

[11] Patent Number: 4,751,119
[45] Date of Patent: Jun. 14, 1988

[54] CONTAINER FOR SELF-HEATING OR SELF-COOLING OF DRINKS OR FOODSTUFFS BY AN EXOTHERMIC OR ENDOTHERMIC REACTION

[75] Inventor: Hiroyuki Yukawa, Nagoya, Japan
[73] Assignee: Murajiroh Ukon, Nagoya, Japan
[21] Appl. No.: 909,112
[22] Filed: Sep. 18, 1986
[30] Foreign Application Priority Data
Sep. 25, 1985 [JP] Japan ............................... 60-213262
[51] Int. Cl.$^4$ .............................................. B65D 25/08
[52] U.S. Cl. .................................... 428/35; 426/109; 206/222; 62/4; 126/263
[58] Field of Search ............... 206/222; 220/20, 20.3, 220/22; 426/109; 62/4; 126/263; 428/35

[56] References Cited
U.S. PATENT DOCUMENTS

3,537,605 11/1970 Solowey .......................... 206/222
3,970,068 7/1976 Sato ................................. 206/222
3,986,838 10/1976 Reichert ........................... 222/5
4,528,218 7/1985 Maione ............................ 206/222

Primary Examiner—John E. Kittle
Assistant Examiner—James J. Seidleck
Attorney, Agent, or Firm—Wenderoth, Lind & Ponack

[57] ABSTRACT

A container for self-heating or self-cooling drinks or foodstuffs housed in the container has a diaphragm and a breaker capable of completely shattering the diaphragm with ease for delivering a liquid reactant to an exothermal or endothermal solid reactant. The container is partitioned into three chambers. One chamber contains drinks and foodstuffs, one contains exothermal or endothermal solid reactants, and one contains a liquid reactant. The diaphragm is made of thin prestressed glass partition between the reactant chamber containing the exothermal or endothermal solid reactant and the chamber containing the liquid reactant. Actuation of the breaker forms a large hole by shattering the prestressed glass diaphragm. The liquid reactant passes through the hole and contacts the exothermal or endothermal reactant, and the ensuing exothermal or endothermal reaction releases or absorbs energy to rapidly heat or cool the drinks or solid foodstuffs. Alternatively, a plastic diaphragm having a scoreline provided at the outer periphery thereof may be used.

11 Claims, 7 Drawing Sheets

CONTAINER FOR SELF-HEATING OR SELF-COOLING OF DRINKS OR FOODSTUFFS BY AN EXOTHERMIC OR ENDOTHERMIC REACTION

BACKGROUND OF THE INVENTION

1. Field of the Invention:

The present invention relates to a container for rapidly heating or cooling drinks or foodstuffs by an exothermic or endothermic reaction, and more particularly, to a container partitioned into three rooms or chambers. One room has a solid reactant, a second room has a liquid reactant, and a third room has drinks or foodstuffs. Further, the present invention relates to a container in which exothermal and endothermal reactions are generated by mixing with each other when foodstuffs or drinks are to be eaten up or drunk. Energy generated by the reactions is delivered to the drinks or foodstuff to rapidly heat or cool drinks or foodstuffs.

2. Description of the Prior Art:

This type of can or container is known conventionally.

However, conventional containers are complicated in structures, expensive have problems in conservation of the reactants, insufficient reactant effects, uneasy handling, and further have the problem that the drinks or foodstuffs can not be rapidly heated or cooled when required. Under such circumstanses such containers, etc. are not successful on a commercial basis.

The instant inventor knows of the following prior art, namely as disclosed in U.S. Pat. Nos. 3,970,068 and 4,528,218.

The former invention U.S. Pat. No. 3,970,068 has a container in which three rooms or chambers are provided. Drinks and food stuffs are contained in a first room, a solid reactant is contained in a second room, and a liquid reactant is contained in a third room.

There is provided a thermoplastic resin tank at the side of a bottom cover, a recess partially covering the bottom cover, and a needle directed to the recess of the bottom cover corresponding to a position of the recess. When the bottom cover is pressed inwardly, the needle which is now actuated normally breaks the tank by stabbing the recess portion. Thus, drinks and foodstuffs are to be drunk and eaten up the drinks and foodstuffs are heated or cooled by exothermal or endothermal reactions which are generated by the liquid reactant is oozed outside the tank and delivered to the solid reactant contained in the next room.

According to this example, drinks and foodstuffs are theoretically heated and cooled but there are the following problems showing why it is not successful on a commercial basis.

The liquid reactant is gradually delivered to the solid reactant because the needle stabs the tank and breaks a small part of the tank from which the liquid reactant is oozed out. Thus, the exthothermal and endothermal reactions of the solid reactant are not rapidly effected. It requires a long period of time to heat or cool the drinks and foodstuffs when they to be drunk and eaten up. Thus, there is the problem that the drinks and foodstuffs are not heated or cooled in a short period of time.

Also, quick lime is employed as an exothermal reactant. There is a problem that the container is explosive because the quick lime generates a gas during the exothermal reaction.

On the other hand the latter invention, U.S. Pat. No. 4,528,218, relates to a container having three rooms, in which drinks and foodstuffs are contained in a first room, a liquid reactant is contained in a second room, and solid reactant is contained in a third room.

There is provided a diaphragm between the second and third rooms. There is no description of the material of the diaphragm which is however subjected to thermal sealing by the material capable of pealing off. When the container is used, a bottom cover is pressed inwardly to actuate a breaker provided in the container, breaking the diaphragm so that the liquid reactant is oozed out and delivered to the solid reactant to thereby generate the exothermal and the endothermal reactions.

As a result the drinks and foodstuffs are heated or cooled accordingly.

However, according to that latter invention the diaphragm is partially broken and not broken entirely.

The latter invention may make the liquid reactant deliver to the solid reactant more smoothly, but does not make the liquid reactant at once deliver to the solid reactant by breakage of the diaphragm all at once.

The latter invention is not commercially successful because the drinks and foodstuffs can not be heated or cooled based on the exothermal or the endothermal reactions.

SUMMARY OF THE INVENTION

It is an object of the present invention to provide a container for self-heating or self-cooling of drinks or foodstuffs capable of rapidly effecting an exothermal or endothermic reaction. It is another object of the present invention to provide a container capable of achieving the object mentioned above and capable of being easily fabricated.

It is a further object of the present invention to provide a container capable of reducing cost for manufacture on commercial basis.

Other objects and advantages of the present invention will be easily understood from the description and the attached drawings.

DESCRIPTION OF PREFERRED EMBODIMENT

The structure of a container, for example, a can used in the present invention is the same as a known one which is manufactured in mass production. Inside of the container is partitioned three rooms or chambers including a room containing drinks and foodstuffs, a room containing a solid reactant for heating or cooling drinks and foodstuffs, and a room containing a liquid reactant to react with the solid reactant.

Most portions of the room containing the solid reactant are close to the room housing the drinks and foodstuffs.

There is provided a diaphragm between the room containing the solid reactant and the room containing the liquid reactant, and the diaphragm is made of an improved prestressed glass which is completely broken at a stroke to be changed from a unitary solid to granules. More in detail, a partition between the room containing the drinks and foodstuffs and the room containing reactant is airtightly provided.

The reactant is preferably a solid one according to the present invention but is not to be limited to a solid one and may be a liquid one. The room containing a solid reactant and the room containing a liquid reactant are airtight as is the foodstuffs room.

The diaphragm mentioned above is made of an improved this prestressed glass breakable into granular form.

An advantage of the present invention resides in employing an improved prestressed glass as a diaphragm.

The prestressed glass may be replaced with a plastic thin plate provided with a scoreline. According to the present invention, there are provided three rooms in which a liquid room is partitioned by a diaphragm and contains water and aqueous ammonia, and an end of a breaker is fixed to the diaphragm and the other end is free and positioned adjacent the bottom cover in a slightly spaced relation therefrom.

The breaker in the liquid room is not actuated until the drinks and foodstuffs are drunk or eaten up. Then, a shock is applied to an end fixed to the diaphragm of the breaker which is delivered to the diaphragm thereby breaking at once the diaphragm into a granular form so that the liquid room and the reactant room are communicated with each other for allowing the liquid reactant to enter into the reactant room to react with the solid reactant contained therein. As a result, the exothermal or endothermal reactions are generated to thereby heat or cool the drinks and foodstuffs by utilizing energy released or absorbed by such reaction.

The exothermal and endothermal reactants are, of course, contained in the reactant room, and the drinks and foodstuffs are housed in the drinks and foodstuffs room.

The breaker housed in the liquid room is fixed to the diaphragm at one end thereof, and is provided in a free state toward the bottom cover of the body with a slight spaced interval from the bottom cover. There is another embodiment in which an end of the breaker is provided toward the diaphragm with a slight spaced interval from the diaphragm, and is fixed to the bottom cover at the other end thereof.

There may also be employed a diaphragm made of a thin plastic plate and having a scoreline at the outer periphery thereof. The a breaker is provided in the liquid room and end of this breaker has a shape contacting with the entire inner periphery of the scoreline for applying a force to the whole of the scoreline.

An embodiment of the present invention will be described with reference to the attached drawings.

Figure 1:
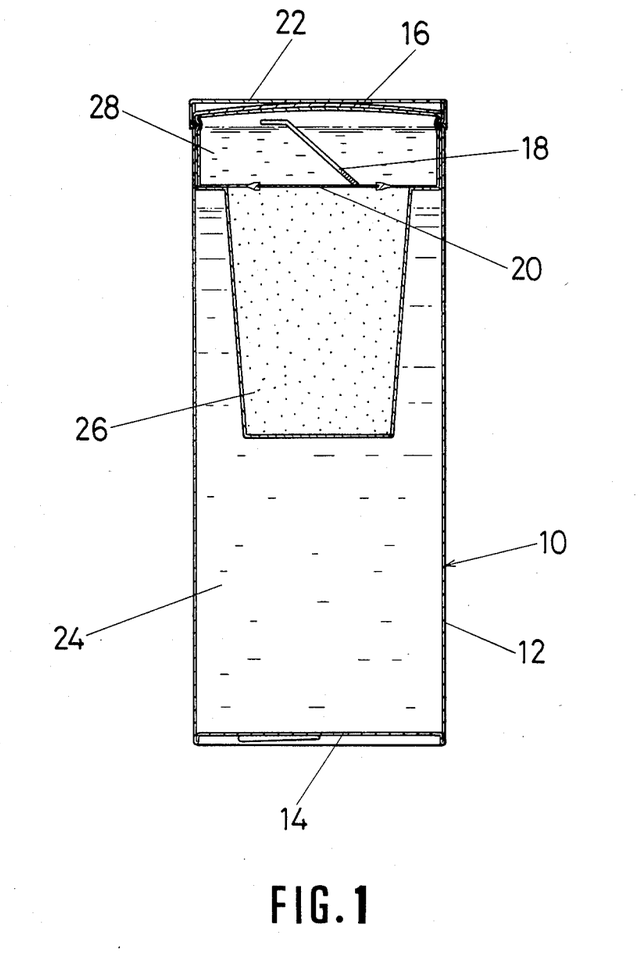
FIG. 1 is a schematic cross-sectional view of a container which is shown upside down.

First Embodiment:

FIG. 1 shows a container which is positioned upside down.

A structure of the body 10 may be an aluminum can or a container made of plastics or processed paper if they are thermally resistant.

The container comprises a wall 12, a ceiling 14, and a bottom cover 16. There is provided an outer cover 22 made of soft plastic outside the bottom cover 16, which is a shock absorber for preventing the diaphragm 20 from being broken by the breaker 18 owing to a slight shock during a transportation thereof. The bottom cover 16 may be provided horizontally, straight or bent slightly outwardly without being bent slightly inwardly, and having a circular arc in cross section as employed in known beer cans as the bottom cover 16 is easily pushed down when used.

The outer cover 22 does not essentially affect the present invention.

The inside of the container 10 is partitioned into three rooms. The drinks and foodstuffs room 24, containing bulky drinks and foodstuffs, is formed at the side of the ceiling 14. The drinks and foodstuffs to be contained in the drinks and foodstuffs room 24 are, for example, drinks such as coffee, beer, juice, alcohol for drinks, or soup, and solid foodstuffs such as hamburger. These drinks and foodstuffs may be heated or cooled depending on the seasons or taste of the user. A cylindrical reactant room 26 is provided extending greatly into the drinks and foodstuffs room 24. The reactant room 26 contains the exothermal or endothermal reactants described later.

The reactant room 26 may have a plurality of fins (not shown) protruding into the drinks and foodstuffs room 24 for effectively operating the exothermal or endothermal reactions. The reactant room 26 may be shaped as a bellows. A peripheral surface of the reactant room 26 positioned at the bottom cover 16 is extended to an inside of the wall 12 of the body 10. The inside of the wall 12 and the reactant room 26 positioned at the bottom cover is airtightly partitioned. A liquid room 28 is provided between the bottom cover 16 and the reactant room 26 for housing water and aqueous ammonia. There is provided a diaphragm made of an improved prestressed thin glass which is breakable by a relatively weak shock described later between the liquid room 28 and the reactant room 26.

The liquid room 28 is airtightly formed with the reactant room 26 and with the drinks and foodstuffs room 24 by a portion extending to the wall 12 at the side of the bottom cover 16 of the reactant room 26.

Figure 2:
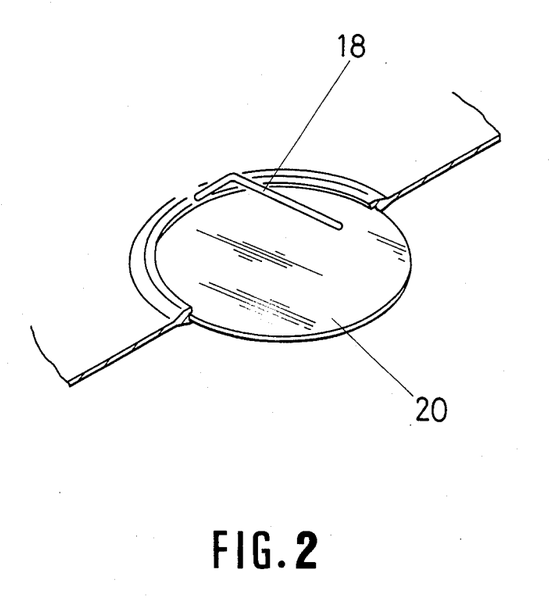
FIG. 2 is an enlarged view showing a diaphragm and a breaker of FIG. 1.

The diaphragm 20 has a rod type breaker 18 fixedly mounted at the end thereof that is made of an ordinary glass or hard plastic and that applies a shock to the diaphragm 20.

An end of the breaker 18 is provided at free state and the other end of the breaker 18 is provided toward the bottom cover 16 at a slight spaced interval from the bottom cover 16 without contacting with the bottom cover 16.

The breaker 18 is not actuated to break the diaphragm 20 under ordinary conditions. In use the diaphragm 20 is broken all at once by pushing down the bottom cover 16.

According to the present invention, the diaphragm 20 is structured to be broken with ease and the reactant is not scattered outside the body 10 when the exothermal and endothermal reactants are generated.

This is advisable from a hygienic point of view because the container contains the drinks and foodstuffs.

The breaker 18 is bent at the side of the bottom cover in parallel with the bottom cover 16 and inclined toward the diaphragm 20.

As mentioned above, the drinks and foodstuffs room 24 houses one of drinks or foodstuffs, and the reactant room or chamber 26 contains the exothermal or endothermal reactant, and further the liquid room or chamber 28 contains a water solution such as water and aqueous ammonia. The container is made by providing the breaker 18 at the bottom portion of the body 10 while all these three rooms are airtightly partitioned with respect to each other.

Figure 3:
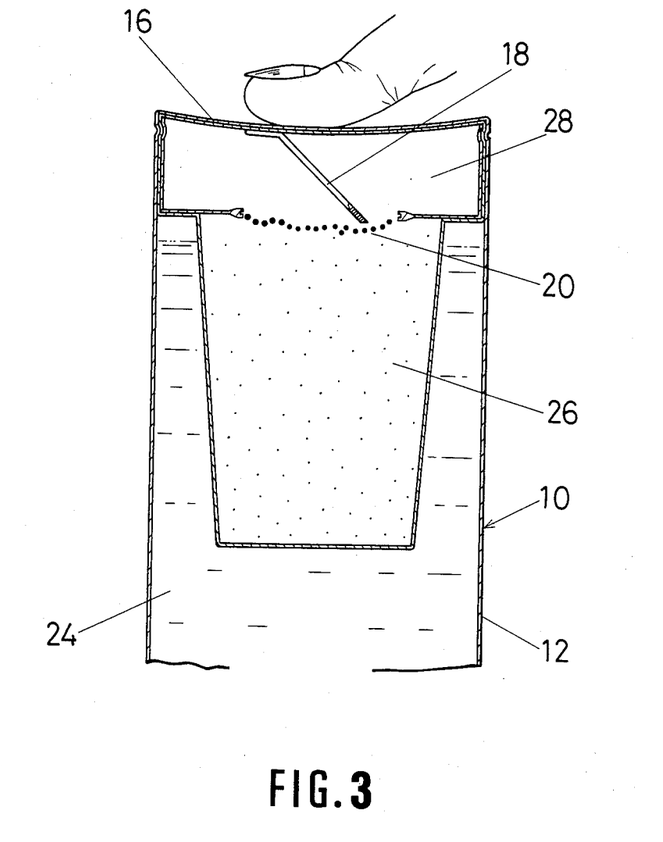
FIG. 3 is a schematic view showing a use of a container of FIG. 1.

When the users drink and eat up the drinks and foodstuffs they remove the outer cover 22 from the bottom cover 16 by pressing the bottom cover 16 toward the breaker. A pressing force applied to the bottom cover 16 is delivered to the end of the breaker 18 to thereby apply a slight shock to the diaphragm which is at once broken and penetrated.

It is understood that the shape of the bottom cover 16 may be straight or slightly curved outwardly to form circular arc (in cross section) so that the bottom cover 16 is easily pressed down.

Thus, the liquid reactant in the liquid room 28 is released at once into the reactant room 26 for allowing the liquid reactant to mix with the solid reactant to generate rapidly a chemical reaction. When the reaction is exothermal, the chemical reaction generates a heating energy which is delivered to the drinks and foodstuffs in the drinks and foodstuffs room 24 to rapidly heat the drinks and foodstuffs. When the reaction is endothermal, the drinks and foodstuffs are rapidly cooled.

A structure of the diaphragm 20 of the present invention will now be described.

The diaphragm made of a thin glass plate is processed to be broken in many minute granules and spread over a wide range when broken by a slight shock applied to a part thereof.

The prestressed glass of this type is widely employed for use in an automobile in view of prevention of injury in an accident. The glass is manufactured in the manner that after a plate glass is heated, the heated glass is rapidly cooled by blowing water and air toward the heated glass. The glass employed in an automobile is limited to one that is relatively thick. A thin glass, such as 1 to 2 mm is not manufactured as it is broken when it is cooled. The known glass to be employed in an automobile is not used by this invention because the glass employed by this invention has a thickness of about 1 mm which is easily broken by a slight shock caused by a pushing by a finger while the former employed as a front windshield of an automobile must be broken by a relatively heavy shock. Viscous oil is used in the cooling process of the glass. More in detail, the plate glass, from which the diaphragm 20 is formed having a thickness of 1 to 2 mm is heated at a temperature ranging from 600° to 700° C. which is a limiting temperature at which the glass is not deformed, and the heated glass is immersed into a nonflammable viscous oil which is heated substantially at a temperature of 65° C. such as an engine oil and is rapidly cooled. The thin plate glass, which is normally broken when subject to the cooling process of blowing by water or air, is not broken when subjected to such process. The glass thus processed may be broken by a slight shock or distortion applied thereto and scattered widely as granules. The conventional glass to be broken having a thickness of 3 mm or more is already actually utilized but the glass having a thickness of substantially 1 mm is employed by this invention.

That is, thin glass manufactured by being subjected to the cooling process of blowing of water and air is broken due to a distorting pressing force applied thereto which is caused by sudden thermal shrinkage. According to the present invention, the viscous oil heated at a low temperature airtightly contacts with the surface of the glass to absorb the heat of the glass and form an oil film at a high temperature. The advantage as mentioned above according to the present invention is achieved by a synergistic effect. The effect being that the viscosity of the oil film at a high temperature mitigates the rapid and instantaneous decrease of the temperature and the viscous oil is heated at a temperature of substantially 65° C. which is higher than water or air to mitigate the effect of cold when immersed instantaneously. It is known that prestressed glass is transformed dynamically to granules when a shock is applied to a part of the glass irrespective of the shapes thereof.

The present invention utilizes the improved prestressed glass having a characteristic that in a normal state it has a strength comparable with a metal and is broken as a whole.

The diaphragm 20 employs the glass manufactured as mentioned above.

It is necessary to generate with ease an exothermal or endothermal reaction before drinking or eating up the drinks or foodstuffs. The glass employed in the conventional automobile is not easily broken but is cracked, so that the glass having a thin thickness as mentioned above must be employed in the present invention.

The exothermal and endothermal reactants employed by the present invention are now described.

The exothermal reactants:

quick lime, sodium hydroxide, cobalt, chromium, iron, iron hydroxide, magnesium, manganese, molybdenum, tin oxide (II), titanium, sodium, calcium hydroxide, sulfuric acid, nitric acid, metallic sodium, etc.

Among them, a powder of magnesium chloride is preferable. The reactants which emit gas in large amount, convert to a strong acid or strong alkali, or contrary to the fire code or food administration act are not preferable.

The reactants are those generating an oxide reacting with oxygen at room temperature in the form of a revived metal or a metalic compound and having an exothermic characteristic. It is preferable to mix two or more metal powders.

The endothermal reactant:

ammonium nitrate, salts such as ammonium salfurate, potassium nitrate, sodium thiosulfate.

A mixture of potassium thiocyanate with urea dissolved in aqueous ammonia is preferable. A mixture rate of both is preferable as 3:1 to 2:3 and the mixture is preferably dissolved in aqueous ammonia.

A temperature to be obtained by the endothermal reactant with 100 parts of water under the conditions of a room temperature 30° C., liquid temperature 28° C. when ammonium chloride, potassium thiocyanate, ammonium nitrate, urea or mixtures thereof are solved by water, results of which is shown in Table 1.

TABLE 1

| | Endorthermal | Amount | Temperature |
|---|---|---|---|
| 1 | ammonium chloride | 30 parts | 15 C. |
| 2 | potassium thiocyanate | 100 parts | 7 C. |
| 3 | potassium nitrate | 100 parts | 10 C. |

TABLE 1-continued

| | Endorthermal | Amount | Temperature |
|---|---|---|---|
| 4 | urea | 100 parts | 12 C. |
| 5 | ammonia nitrate and urea | 100 parts 100 parts | 11 C. |
| 6 | potassium thiocyanate and urea | 100 parts | 5 C. |

As evident from the above results, when potassium thiocyanate only, or a mixture of potassium thiocyanate with urea are used as the endothermal reactants, a minium temperature is obtained.

Figure 4:
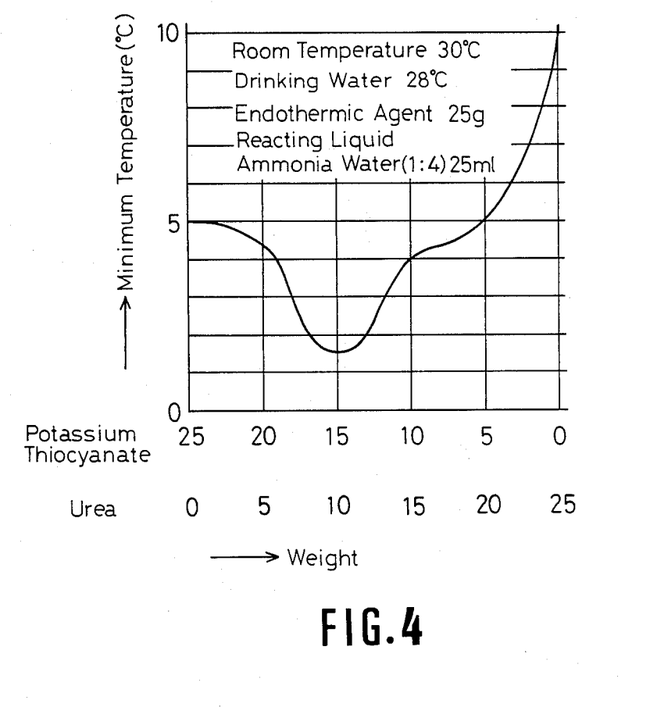
FIG. 4 is a graph showing a relation between mixture ratio of potassium thiocyanate and urea as endothermal reactant and a minimum temperature according to the present invention.

Among Table 1, as to a mixture rate of a mixture of potassium thiocyanate and urea, a minimum temperature obtained by dissolving 25 g of endothermal reactant of a mixture of potassium thiocyanate and urea changing a mixture rate thereof into a solution of aqueous ammonia (1:4) 25 ml under the room temperature of 30° C. is shown in FIG. 4. A minimum temperature is obtained when a mixture rate of potassium thiocyanate and urea is in the range of 15 g : 10 g to 10 g : 15 g. When the mixture rate of potassium thiocyanate with urea being 3:2 to 2:3 is dissolved in water a superior cooling effect is obtained incomparable to the effect obtained by a single reactant.

The cooling effect thus obtained is based on a synergistic effect of a mixture ratio of potassium thiocyanate and urea being dissolved in aqueous ammonia as it is impossible to obtain a temperature lower than that obtained by only potassium thiocyanate or ammonium nitrate.

Figure 5:
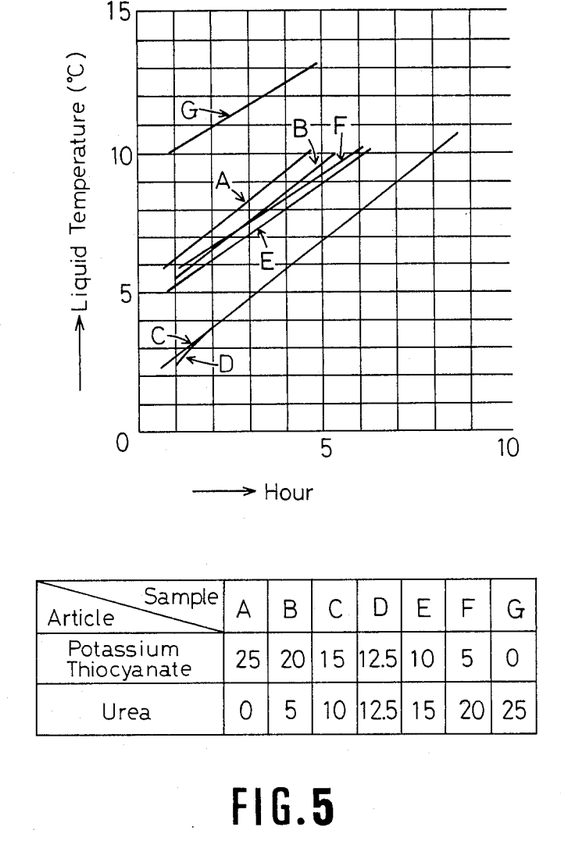
FIG. 5 is a graph of a characteristic curve showing a change of temperature over time.

FIG. 5 shows the relation of minimum temperature obtained by a different ratio of the mixture of potassium thiocyanate and urea, a temperature change caused by a lapse of time. When a reactant 25 g of a different ratio of mixture is added to aqueous ammonia in the ratio of 1:4, it becomes minimum one minute after adding aqueous ammonia. It is evident that the mixture of potassium and urea in the ratio of 3:2 to 2:3 referred to as endothermal Nos. 3, 4, 5 have a superior cooling effect. No. 3, especially, has a cooling effect as it maintains 6° C. three minutes after a minimum temperature thereof.

An embodiment according to the present invention will now be described.

EXAMPLE 1

A mixture of potassium thiocyanate 15 g and urea 10 g is contained in one container and aqueous ammonia 25 g with ration of 4:1 with respect to the mixture is contained in another container. When used the aqueous ammonia is added to the mixture.

Aqueous ammonia is airtightly contained in a relative soft synthetic resin as a conventional endothermal reactant. The container containing aqueous ammonia and a mixture of potassium chirocyanate and urea are contained airtightly in another strong soft synthetic bag, and when used, the container containing aqueous ammonia is breached and mixed with the endothermal reactant and thermal exchange is effectively carried out. Minimum temperature and a change of temperature according to the embodiment are shown in FIG. 2.

A test is carried out in the manner that a mixture reactant is contained in a breaker under the conditions of room temperature 28° C., liquid temperature 28° C., and aqueous ammonia being added to the mixture.

TABLE 2

| Lapsed time | liquid temperature (C.) |
|---|---|
| 1 minute and 2 seconds | 2.5 (minimum) |
| 1 minute and 14 second | 3 |
| 2 minutes and 7 second | 4 |
| 3 minutes and 15 seconds | 5 |
| 4 minutes and 12 seconds | 6 |
| 5 minutes and 6 seconds | 7 |
| 6 minutes and 10 seconds | 8 |
| 7 minutes and 6 seconds | 9 |
| 8 minutes and 7 seconds | 10 |

EXAMPLE 2:

Aqueous ammonia is added to the mixture of potassium thiocyanate with a ratio of 4:1, and other factors are the same as Example 1:

TABLE 3

| Lapsed time | Liquid temperature (C.) |
|---|---|
| 1 minute and 20 seconds | 3 (minimum) |
| 2 minutes and 3 seconds | 4 |
| 3 minutes and 6 seconds | 5 |
| 4 minutes and 4 seconds | 6 |
| 5 minutes and 2 seconds | 7 |
| 6 minutes and 8 seconds | 8 |
| 7 minutes and 4 seconds | 9 |
| 8 minutes and 13 seconds | 10 |

EXAMPLE 2

The second embodiment is substantially the same as the first embodiment (see FIGS. 1-3) in which the breaker 18 does not contact with the bottom cover 16 at the side of bottom cover 16 and is provided in a free state with a spaced relation with the bottom cover 16 with the other end thereof being fixed to the diaphragm 20.

According to the present example (see FIG. 6), an end of breaker 30 is not fixed to the diaphragm 20 but provided in a free state at a slight spaced interval from the diaphragm, and the other end of the breaker 30 is fixed to the interior of the bottom cover 16.

Figure 6:
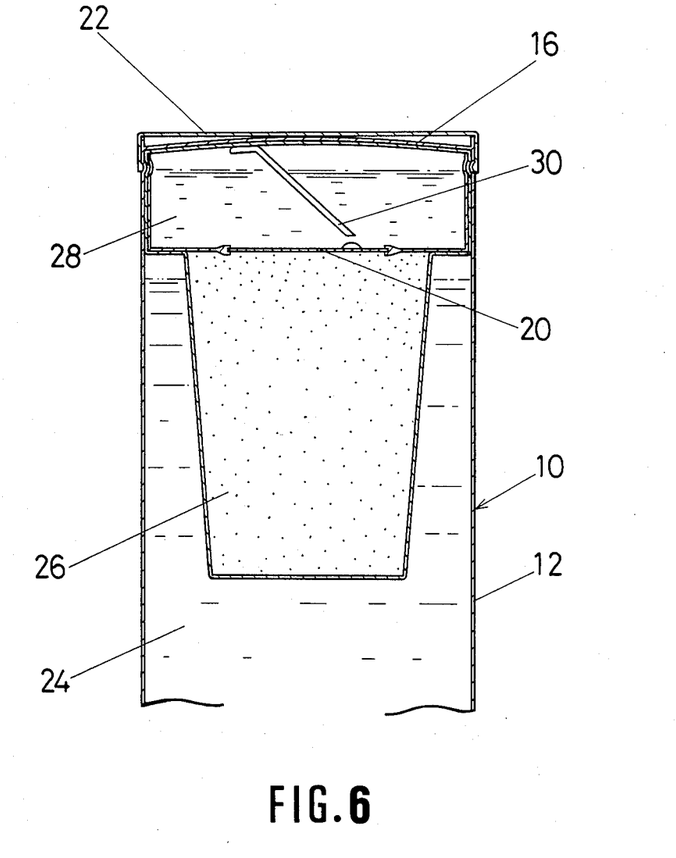
FIG. 6 is a schematic cross-sectional view of a container which is shown upside down according to another embodiment of the present invention.

Other structures are the same as described in Example 1, so they are omitted. A usage thereof is also same as Example 1.

Embodiment 3:

This embodiment (see FIG. 7) is almost the same as the previous embodiments except for the structure of the diaphragm as set forth in Example 1. Therefore, only the different portion is described herewith. A diaphragm 32 is formed as a relatively thin plastic plate and has a score 34 having a same thickness provided at the peripheral circumference. The score 34 is arranged to be broken by a relatively weak pressing force.

Figure 7:
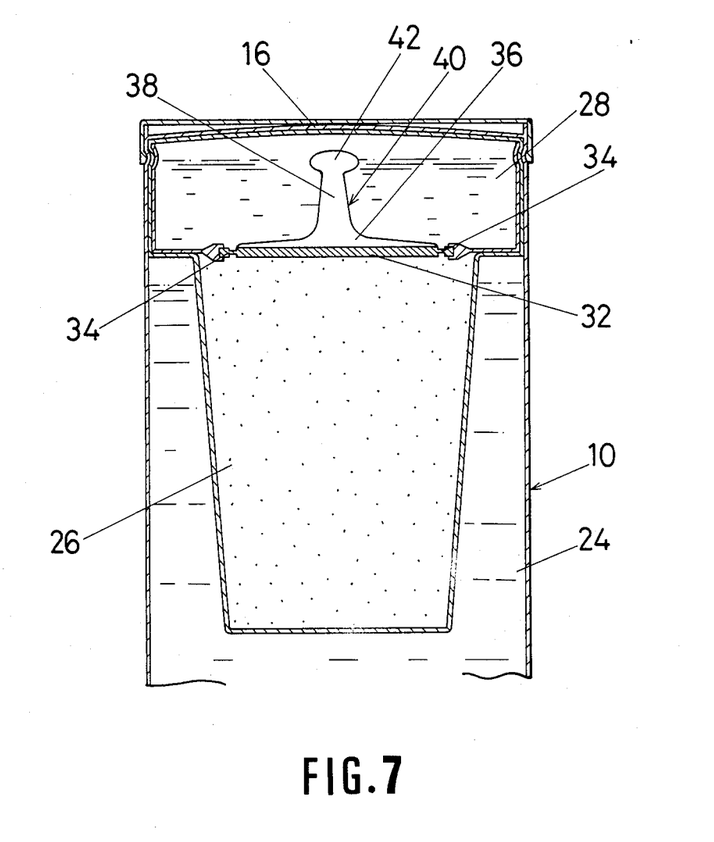
FIG. 7 is a schematic cross-sectional view of a container which is shown upside down according to a further embodiment of the present invention.

A diaphragm breakage portion 36 having an area covering the entire area of the diaphragm 32 is provided over the diaphragm 32 for breaking at once the diaphragm 32. A diaphragm operation lever 38 extend upwardly at the central portion of the diaphragm breakage portion 36 and a breaker 40 is provided inside the liquid room 28.

A flat protruder 42 is provided adjacent the side of the bottom cover 16 of the diaphragm operation lever 38 to receive with ease a pressing force generated when the bottom cover 16 is pressed inwardly.

The protruder 42 is provided with a slightly spaced interval from the bottom cover 16 at a free state. Therefore,the diaphragm is at once broken by applying a pressing force from the side of the bottom cover 16 in the same manner as in Embodiment 1 so that the drinks and foodstuffs are rapidly heated or cooled by the exothermal and endothermal reaction.

What is claimed is:

1. A container for self-heating or self-cooling drinks or foodstuffs by an exothermal or endothermal reaction, said container comprising:

a drink or foodstuff chamber for containing drinks or foodstuffs therein;

a liquid chamber provided in said container, and containing a liquid reactant therein;

a reactant chamber provided in said container adjacent to said liquid chamber, and containing a solid reactant;

a partition located between said liquid chamber and said reactant chamber, said partition being a diaphragm of 1 to 2 mm thick prestressed glass processed by heating said glass at a temperature which is higher than a normal temperature, yet which does not deform the glass, the glass then having been immersed in a nonflammable viscous material, and then rapidly cooled;

a breaker provided in said liquid chamber; and wherein, when a user pushes on a wall of said liquid chamber in which said breaker is contained, said breaker breaks said prestressed glass diaphragm, whereby said liquid and solid reactant contact each other and cause an exothermal or endothermal reaction, thereby heating or cooling the drink or foodstuff.

2. A container according to claim 1, wherein said breaker is attached to said diaphragm at one end thereof, and the other end of said breaker is free and postitioned adjacent and spaced apart from a wall of said container.

3. A container according to claim 1, wherein said solid reactant is magnesium chloride and said liquid reactant is water.

4. A container according to claim 1, wherein said solid reactant is potassium thiocyanate.

5. A container according to claim 1, wherein said solid reactant is a mixture of potassium thiocyanate and urea dissolved in ammonia.

6. A container according to claim 5, wherein a mixture ratio of potassium thiocyanate and urea is in the range of 3:2 to 2:3.

7. A container for self-heating or self-cooling drinks or foodstuffs by an exothermal or endothermal reaction, said container comprising:

a drink or foodstuff chamber for containing drinks or foodstuffs therein;

a liquid chamber provided in said container, and containing a liquid reactant therein;

a reactant chamber provided in said container adjacent to said liquid chamber, and containing a solid reactant;

a partition located between said liquid chamber and said reactant chamber, said partition being a diaphragm of 1 to 2 mm thick prestressed glass processed by heating said glass at a temperature which is higher than a normal temperature, yet which does not deform the glass, the glass then having been immersed in a nonflammable viscous material, and then rapidly cooled;

a breaker provided in said liquid chamber, attached to a wall of said container at one end thereof, and having a free end thereof positioned adjacent and spaced apart from said prestressed diaphragm; and wherein, when a user pushes on the wall of said container to which said breaker is attached the free end of said breaker strikes said prestressed glass diaphragm and breaks said diaphragm, whereby said liquid and solid reactant contact each other and cause an exothermal or endothermal reaction, thereby heating or cooling the drink or foodstuff.

8. A container according to claim 7, wherein said solid reactant is magnesium chloride and said liquid reactant is water.

9. A container according to claim 7, wherein said solid reactant is potassium thiocyanate.

10. A container according to claim 7, wherein said liquid reactant is a mixture of potassium thiocyanate and urea dissolved in ammonia.

11. A container according to claim 10, wherein a mixture ratio of potassium thiocyanate and urea is in the range of 3:2 to 2:3.

* * * * *